(12) United States Patent
Saitner et al.

(10) Patent No.: US 8,556,058 B2
(45) Date of Patent: Oct. 15, 2013

(54) DEVICE FOR ACTUATING A PARKING LOCK

(75) Inventors: Martin Saitner, Berkheim (DE);
Martin Hoffmann, Eriskirch (DE);
Florian Klein, Friedrichshafen (DE)

(73) Assignee: ZF Friedrichshafen AG, Freidrichshafen (DE)

( * ) Notice: Subject to any disclaimer, the term of this patent is extended or adjusted under 35 U.S.C. 154(b) by 369 days.

(21) Appl. No.: 13/051,316

(22) Filed: Mar. 18, 2011

(65) Prior Publication Data
US 2011/0240437 A1    Oct. 6, 2011

(30) Foreign Application Priority Data
Mar. 31, 2010    (DE) .................. 10 2010 003 508

(51) Int. Cl.
*F16H 63/38*    (2006.01)
(52) U.S. Cl.
USPC ................. 192/219.6; 188/106 R; 74/490.11
(58) Field of Classification Search
USPC ........................ 192/219.4–219.6; 74/490.11
See application file for complete search history.

(56) References Cited

U.S. PATENT DOCUMENTS

| 3,110,363 | A  | * | 11/1963 | Chapman, Jr. et al. ......... 188/69 |
| 6,471,027 | B1 |   | 10/2002 | Gierer et al. |
| 6,619,459 | B2 | * | 9/2003  | Gudlin ...................... 192/219.4 |
| 6,848,545 | B2 | * | 2/2005  | Scheuring et al. ............ 188/2 D |
| 7,650,978 | B2 |   | 1/2010  | Ruhringer et al. |
| 2011/0146439 | A1 | * | 6/2011 | Saitner et al. .............. 74/473.25 |

FOREIGN PATENT DOCUMENTS

| DE | 44 22 257 C1 | 11/1991 |
| DE | 198 34 156 A1 | 2/2000 |
| DE | 100 15 782 A1 | 1/2002 |
| DE | 100 45 953 A1 | 5/2002 |
| EP | 1719679 A2 * | 11/2006 |

OTHER PUBLICATIONS von H. Naunheimer et al. "Fahrzeuggetriebe", 2. Aufl., 2007, Seite 371, 372.

* cited by examiner

*Primary Examiner* — Richard M. Lorence
(74) *Attorney, Agent, or Firm* — Davis & Bujold, PLLC; Michael J. Bujold

(57) ABSTRACT

A device (1) for actuating a parking lock comprises an emergency release mechanism. The device (1) for actuating the parking lock comprises an electric actuator (2) with an actuator output element (3) which is moveable in translation, and the actuator output element (3), when moved in a first direction, disengages the parking lock and when moved in an opposite second direction, engages the parking lock. The actuator output element (3) is connected to the parking lock by a clutch (6), and the clutch is disengageable, by the emergency release mechanism, to permit manual movement of the clutch in the first direction to disengage the parking lock.

17 Claims, 5 Drawing Sheets

DEVICE FOR ACTUATING A PARKING LOCK

This application claims priority from German patent application serial no. 10 2010 003 508.4 filed Mar. 31, 2010.

FIELD OF THE INVENTION

The invention concerns a device for actuating a parking lock with an emergency release mechanism, comprising an electric actuator with an actuator output element that can be driven in translation.

BACKGROUND OF THE INVENTION

DE 44 22 257 C1 discloses a parking lock with emergency release means for an automatic motor vehicle transmission. The parking lock comprises a parking lock gearwheel and a locking pawl that can be actuated by a selector spindle driven by an electric motor. Emergency release is effected by means of a Bowden cable which activates a spring, via a release lever, for actuating the locking pawl.

DE 198 34 156 A1, by the present applicant, discloses a device for actuating a parking lock by means of a so-termed energy spring, which comprises a positionally fixed parking lock cylinder and a piston that can move therein to actuate a locking element (for example a locking cone) of the parking lock. The piston, also referred to as the control element, is pushed in a first direction, i.e., to engage the parking lock, by a compression spring and is moved back in the opposite direction, i.e., to release the parking lock, by the action of a pressure medium. In this end position, the piston is mechanically locked by means of an electromagnet so that, while the vehicle is moving, the locking pawl cannot fall into the parking lock gearwheel.

From the textbook "*Fahrzeuggetriebe* (Vehicle transmissions)" by H. Naunheimer et al., $2^{nd}$ Edition 2007, pages 371, 372 an electrically activated parking lock, by the present applicant, is known. The known actuating device comprises a piston that can move in a parking lock cylinder, which acts upon a rotatably mounted parking disk which, for its part, comprises, via a connecting rod, a locking cone for locking and releasing a locking pawl. In the event that the actuating device has failed, an emergency release device by means of a Bowden cable is provided, which engages with the parking disk and locks the locking pawl. Thus, in its disengaged condition the parking lock is secured. An emergency release of this type can prove necessary if a vehicle with a defective parking lock has to be towed away.

SUMMARY OF THE INVENTION

The purpose of the present invention is to design an actuating device, of the type mentioned at the beginning, so that it is simpler and more compact.

According to the invention, the actuator output element that can be driven in translation by means of the electric actuator is indirectly or directly connected to the parking lock by a clutch, which can be released by the emergency release means.

By means of the said clutch, the electric actuator is, on the one hand, connected to the parking lock while, on the other hand, the parking lock can be separated from the actuator, which is advantageous especially in the event of an emergency release. As the electric actuator, in this context, a linear electric motor or a plunger coil is particularly suitable which, for example in either case comprises a push-rod as the actuator output element, or a rotation electric motor with a conversion mechanism which converts the rotation movement into a linear movement, for example a ball-nut/ball-spindle or a nut/threaded-spindle. The clutch is, in particular, designed as a clutch that can be locked and released or coupled and uncoupled non-destructively. Particularly suitable as the rotation electric motor is a brushless motor, for example a permanently energized synchronous motor or an asynchronous motor or a reluctance motor. Such motors have mechanically simple structures and are affected little by wear.

In a preferred embodiment, the clutch is in the form of a plug-in clutch such that a first and a second clutch component can be plugged one into the other, in particular coaxially. In that case, the first clutch component is connected indirectly or directly to the actuator output element and the second clutch component is connected indirectly or directly to the parking lock. This allows the two clutch components to be fitted simply and quickly.

According to another preferred embodiment, the two clutch components can be locked by means of at least one locking element. This gives the advantage that when the clutch is locked, i.e. closed, the translation movement can be transmitted in both directions: the locking element, for example a locking cone, can be moved so as to lock or release, i.e., the parking lock is engaged or disengaged. On the other hand, when the clutch is released, the electric actuator can be separated so that emergency release can be carried out. For example, if the parking lock is in the engaged condition (the vehicle is immobilized) and, at the same time, the current for actuating the electric actuator fails because of a defect in the vehicle, the parking lock (without emergency release) could no longer be disengaged and the immobilization of the vehicle could not be released. In such a case, the clutch is released by the emergency release means and the two clutch components separated from one another so that the parking lock is manually disengaged by the emergency release. The vehicle can then be moved, for example towed away.

In a further advantageous embodiment the emergency release is in the form of a traction or a Bowden cable with a traction cable anchor which, at one end, is in active connection with the said at least one locking element and, at the other end, engages on the second clutch component. If the traction cable is actuated for the purpose of emergency release, the locking is first released and then the two components of the plug-in clutch can be pulled apart, so that the clutch is separated and the second clutch component can be moved independently of the first, i.e., of the blocked control motor.

In other preferred embodiments, the at least one locking element can be in the form of a ball, in particular, a ball of a ball-drop catch or else of a securing ring which, in each case, co-operates with the traction cable anchor.

According to a further advantageous design feature, the traction cable anchor is supported relative to the second clutch component by a spring, in particular a compression spring. Thus, in an emergency release, the spring is compressed or, if a tension spring is used, elongated by the cable anchor, and the spring force acts upon the second clutch component. By virtue of the spring, the traction cable anchor is positioned in the plug-in clutch, i.e., retained against a stop with the first clutch component. In this context, the term "spring" also includes any other elastic component that can be used as a spring, or even a plurality of elastic elements that can be combined to form an elastic component, for example one or more spiral spring(s), one or more rubber element(s) or one or more cup spring(s), etc.

In a further preferred embodiment, the first clutch component is in the form of a guide sleeve connected solidly, for example screwed, to the threaded spindle. In this way, the translation movement of the threaded spindle is converted to a movement of the guide sleeve.

According to another preferred embodiment, the second clutch component comprises an extension which slides into a receiving bore of the first clutch component, i.e., the guide sleeve. The two clutch components can thus be plugged coaxially one into the other, i.e., they are simple to assemble. The parting of the two clutch components is equally simple.

In a further preferred embodiment, the extension of the second clutch component can be locked relative to the receiving bore of the first clutch component, and this preferably by means of the ball or securing ring. In this way the clutch is coupled.

According to another preferred embodiment, the second clutch component, i.e., the output element of the clutch, is articulated to a pivoting coupling element. This converts the translation movement of the said output element to a rotation movement and activates a transfer mechanism for actuating the parking lock.

A device as described above is particularly suitable for use in a passenger or utility vehicle, and therein particularly in an automatic transmission or a semi-automatic change-speed transmission.

BRIEF DESCRIPTION OF THE DRAWINGS

An example embodiment of the invention is illustrated in the drawing and will be described in more detail below, further features and/or advantages emerging from the description and/or the drawings, which shows.

DETAILED DESCRIPTION OF THE PREFERRED EMBODIMENTS

Figure 1:
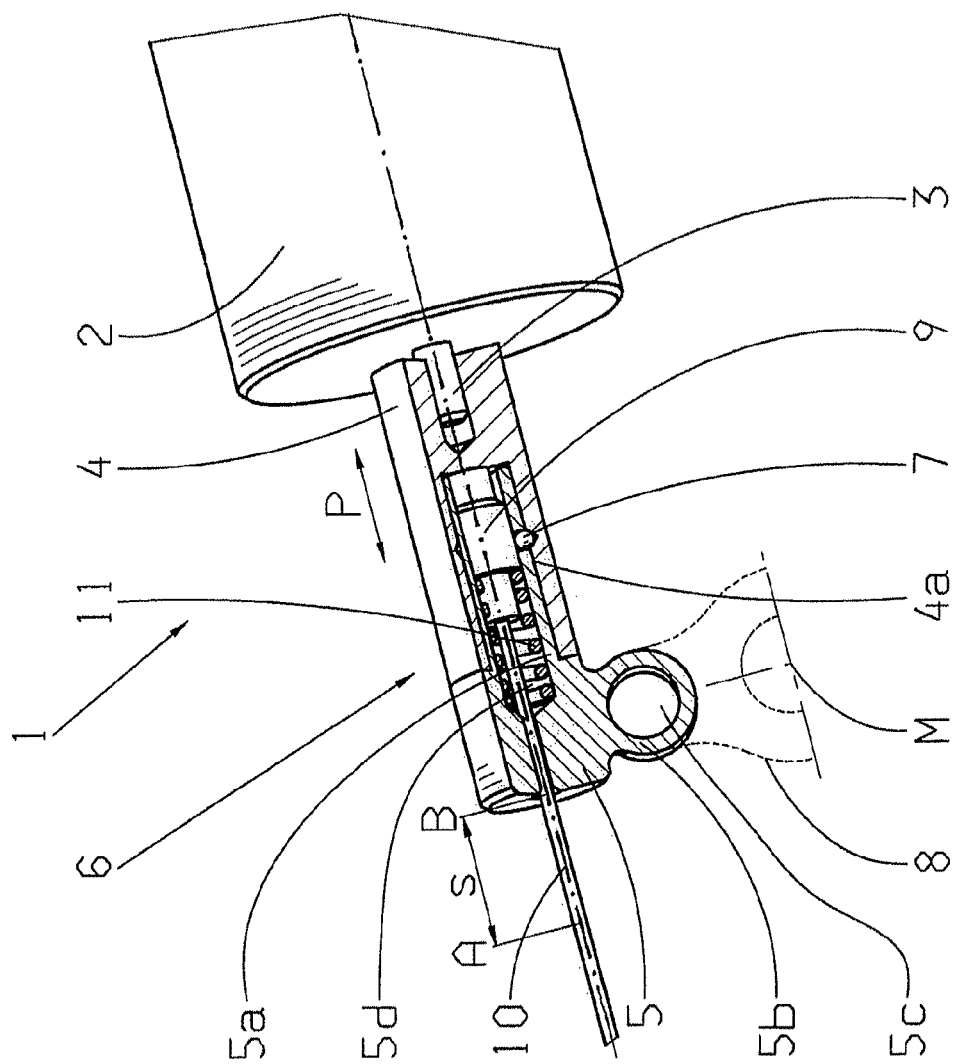
FIG. 1: An actuating device, according to the invention, with a locking plug-in clutch.

FIG. 1 shows a device 1 for actuating a parking lock (not shown), which comprises a parking lock gearwheel (not shown), a locking pawl and a locking element, which is actuated by the device 1. When the parking lock is engaged, the locking pawl engages in the parking lock gearwheel and immobilizes the drive wheels of the vehicle. When the parking lock is released, the locking pawl is out of engagement so that the parking lock gearwheel can rotate freely and the vehicle is ready to be driven. The transfer from the actuating device 1 to the locking element, for example a locking cone, occurs by means of a mechanism which is not shown here but which is clear from the prior art (textbook) mentioned earlier. The actuating device 1 comprises an actuator 2 in the form of an electric motor, also referred to as the control motor 2. The actuator 2 has a threaded spindle 3 as it actuator output element, which can be moved in translation, i.e., in the direction of the double arrow P, such that the translation movement is produced by virtue of a preferably self-locking movement thread located inside the actuator 2, by the rotation movement of a rotor of the actuator 2. The threaded spindle 3, projecting out of the actuator 2, is fixedly connected to a guide sleeve 4, for example by means of a screw connection (not shown), said sleeve serving as the first clutch component. Thus, the guide sleeve 4 transmits the translation movements of the threaded spindle 3 one-to-one. An output element 5, that serves as a second clutch component, is connected to the guide sleeve 4 by a plug-in connection. Thus, the guide sleeve 4 (first clutch component) and the output element 5 (second clutch component) together form a clutch 6 that can be non-destructively locked and released which is, in this case, in the form of a plug-in clutch. In turn, the output element 5 is indirectly or directly connected to the parking lock.

The guide sleeve 4 has a receiving bore 4a and the output element 5 has a cylindrical extension 5a, which slides into the receiving bore 4a. The first clutch component 4 and the second clutch component 5 are locked, i.e., axially fixed relative to one another, by a locking mechanism comprising a locking element 7 in the form of a ball. Thus the movement of the threaded spindle 3, in both directions represented by the double arrow P, is transmitted one-to-one to the output element 5. The output element 5 has an annular attachment-piece 5b with a bolt bore 5c by means of which the actuating device 1 can be connected to the transmission mechanism (not shown) for actuating the locking cone of the parking lock. As an example, broken lines are used to represent a coupling element 8 which can pivot about a pivot point M, whereby the translation movement of the output element 5 is converted into a rotation movement. The coupling element 8 is formed, in particular, by a rotating selector disk of an automatic transmission (not shown), by means of which a number of gear ratios or driving steps of the automatic transmission can also be selected. Alternatively, the coupling element 8 can also be in the form of a rotating parking disk (see the textbook "Fahrzeuggetriebe (Vehicle transmissions)" by H. Naunheimer et al., $2^{nd}$ Edition 2007, pages 371, 372). The output element 5 has an axial bore 5d in which a cable anchor 9 of a traction cable 10 and a compression spring 11 are arranged. The traction cable 10 with its cable anchor 9 are part of an emergency release mechanism by which the plug-in clutch 6 can be released and separated, i.e., the output element 5 (second clutch component) can be uncoupled and released from the guide sleeve 4 (first clutch component).

The actuating device 1 allows the output element 5 to be moved to two end positions, indicated by the letters A, B. The distance between the two end positions A, B, i.e., the movement path, is indexed as s.

Figure 2:
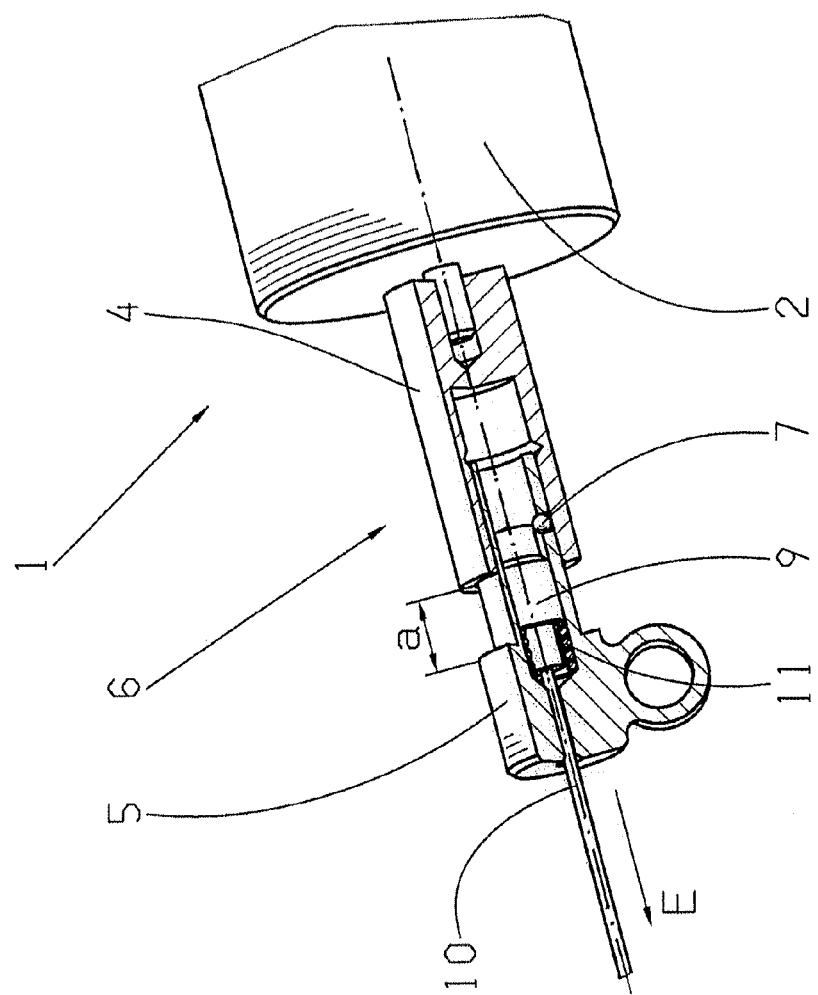
FIG. 2: The actuating device with plug-in clutch released.

FIG. 2 shows the actuating device 1 of FIG. 1 with the clutch 6 separated, i.e., released/uncoupled, in other words the two clutch components 4, 5 can move axially relative to one another. The same components are denoted by the same indexes. The actuating device 1 is shown in the emergency release condition, i.e., the output element 5 is released relative to the guide sleeve 4 and displaced axially by a distance a. The locking element 7 has moved radially inward and thereby permits an axial movement between the first clutch component 4 and the second clutch component 5. The emergency release is effected by pulling the traction cable 10, in the direction of the arrow E, whereby the compression spring 11 is compressed. Movement in the direction of the arrow E continues until the parking lock is in the disengaged condition and the vehicle is no longer immobilized. In this condition, it can be towed away. In this situation, it is expedient to fix the output element 5 in the emergency release position, i.e., with the parking lock disengaged, so that the locking pawl cannot fall into the parking lock gearwheel.

Emergency release is carried out if the electric motor drive, for example as a result of a power failure, is no longer capable of moving the output element 5 away from position A (see FIG. 1, parking lock engaged) to position B (parking lock released). After an emergency release, the output element 5 must be manually reset and the actuator 2 repaired, if necessary.

Figure 3:
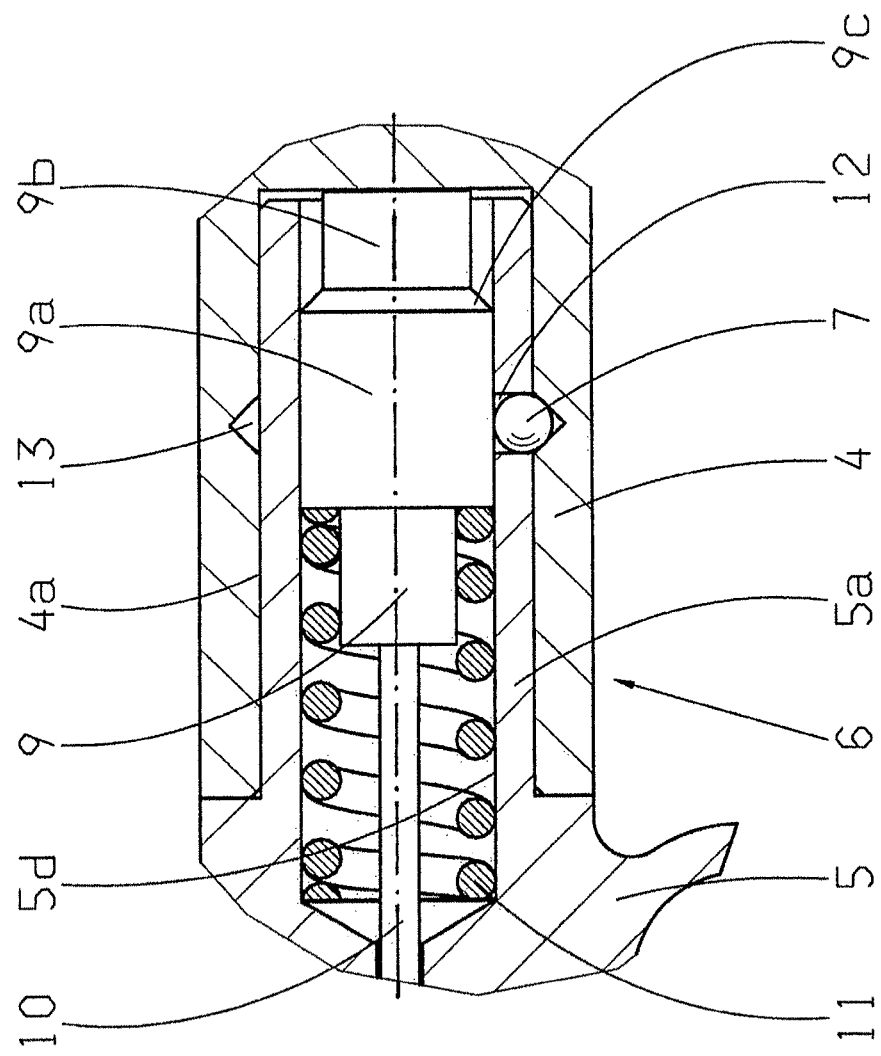
FIG. 3: A locking mechanism with ball-drop catch in the locked condition.

FIG. 3 shows an enlarged representation of a section of the actuating device 1 in FIG. 1, with the traction cable anchor 9 in the locking position. The same components are given the same indexes. The extension piece 5*a* has a radial bore 12, in which the locking element in the form of a ball 7 is inserted radially. In this case, it is preferable to have further balls in respective radial bores of the extension piece 5*a* as additional locking elements, which are preferably uniformly distributed around a periphery of the receiving bore 4*a* and the extension piece 5*a*. In the area of the receiving bore 4*a*, the guide sleeve 4 has an all-round groove 13 with a triangular groove cross-section, in which the ball 7 is retained. Thus, the ball 7, the radial bore 12 and the groove 13 form a so-termed ball-drop catch. The traction cable anchor 9 has two cylindrical sections 9*a*, 9*b* with a larger and a smaller diameter, connected to one another by a conical section 9*c*. The diameter of the section 9*a* corresponds to the diameter of the bore 5*d* of the extension piece 5*a*. In the position illustrated, the traction cable anchor 9, with its cylindrical section 9*a*, blocks any inward movement of the ball 7 with the result that the clutch 6 is closed: the first clutch component 4 and the second clutch component 5 are locked relative to one another in the axial direction.

Figure 4:
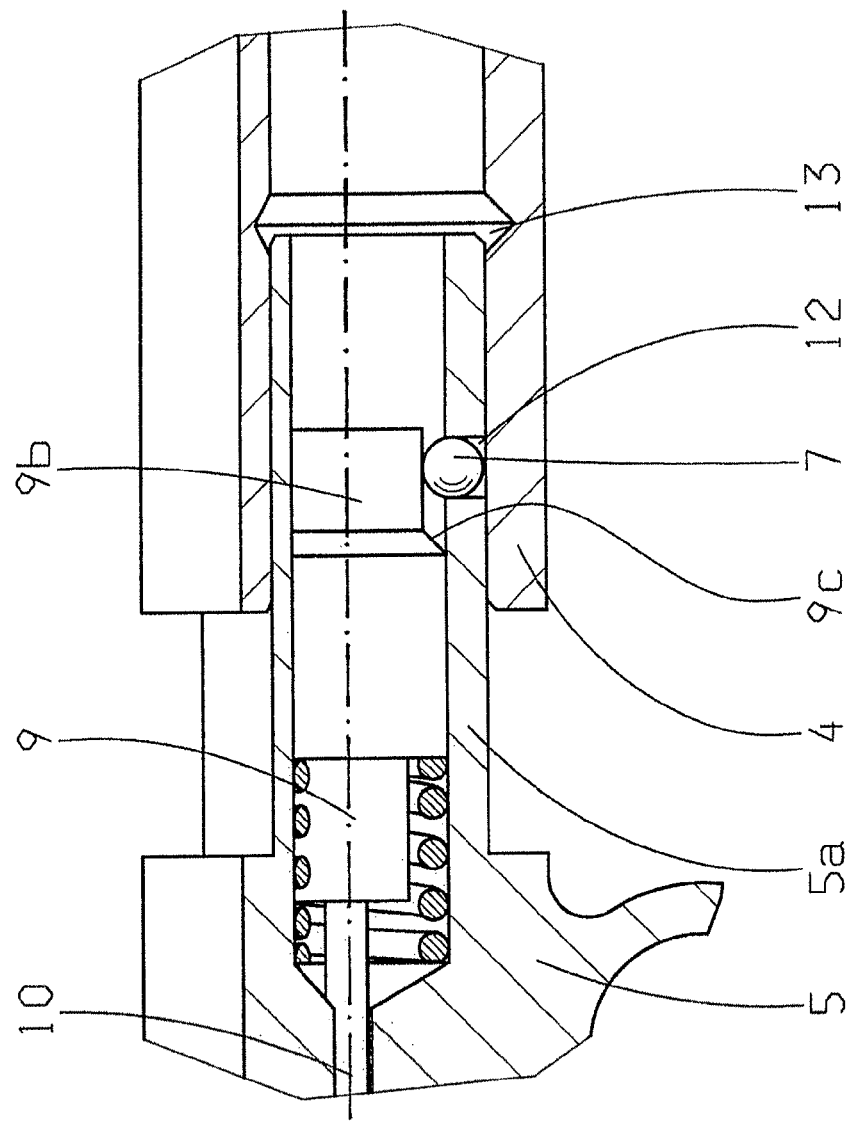
FIG. 4: The locking mechanism in the released condition.

FIG. 4 shows the clutch 6 of FIG. 3 when it is open, i.e., uncoupled/released, so that the two clutch components 4, 5 can move axially relative to one another. By actuating the traction cable 10 in the direction of the arrow E (see FIG. 2), the traction cable anchor 9 is moved so that the cylindrical section 9*b*, with the smaller diameter, is in the area of the radial bore 12. This enables the ball 7 to move radially inward and the block is released (disengaged). For subsequent closing, i.e., coupling/locking of the clutch 6, the two clutch components 4, 5 are once more moved into the other and together, whereby the ball 7 is pressed by the conical section 9*c* back into the groove 13 and the clutch components 4, 5 are firmly locked to one another.

Figure 5:
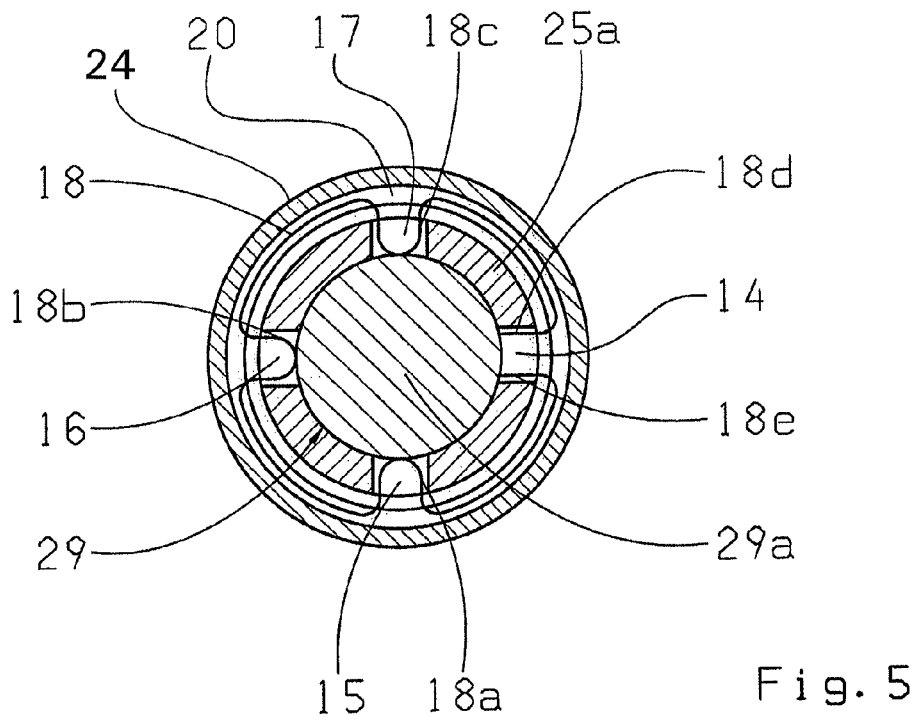
FIG. 5: Another embodiment of a locking mechanism with a securing ring, in the locked condition.

FIG. 5 shows a variant of a locking mechanism, i.e., an alternative to the above-described ball-drop catch consisting of the ball 7, the radial bore 12 and the groove 13 (see FIG. 3) in cross-section. A hatched circular cross-section 29*a* of a traction cable anchor 29 corresponds to the cylindrical section 9*a* of the traction cable anchor 9 in the previous example embodiment. An adjacent annular cross-section 25*a* corresponds to the extension piece 5*a* of the second clutch component 5. An outer annular cross-section 24 corresponds to the guide sleeve 4 or the first clutch component 4. The extension piece 25*a* has four radial through-going openings 14, 15, 16, 17 in which a securing ring 18, which comprises radially inward-directed projections 18*a*, 18*b*, 18*c* and two radially inward-directed ends 18*d* and 18*e*, engage. The guide sleeve 24 has an annular groove 20 in which the securing ring 18 engages. In the position of the securing ring 18 shown, the guide sleeve 24 and the extension piece 25*a* are locked relative to one another in the axial direction. The cross-section 29*a* prevents the stressed securing ring 18 from springing radially inward and so moving out of the groove 20.

Figure 6:
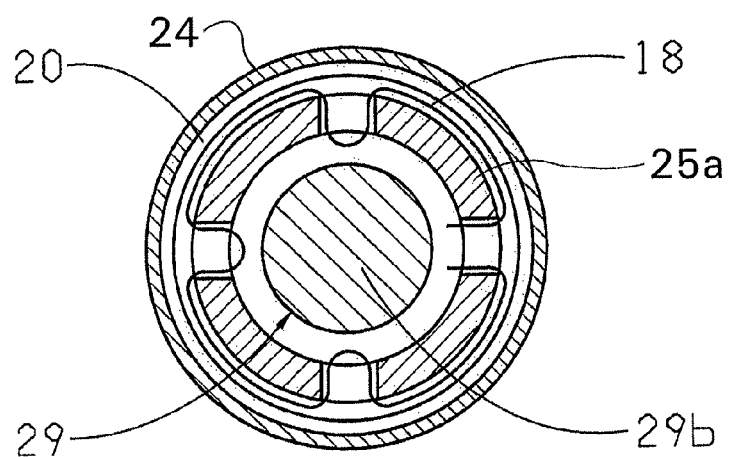
FIG. 6: The locking mechanism with a securing ring in the released condition.

FIG. 6 shows the said alternative locking mechanism of FIG. 5 in the released position, i.e., the securing ring 18 has sprung inward and is no longer engaged in the annual groove 20. The securing ring 18 is enabled to spring inward by pulling back the traction cable anchor 29 so that its cylindrical section 29*b*, with a smaller diameter (corresponding to the cylindrical section 9*b* in FIG. 3), is in the engagement area of the securing ring 18. By virtue of the openings 14, 15, 16, 17, the way is now clear for the projections and ends 18*a* to 18*e* to spring inward. The locking is released.

Indexes

1 Actuating device
2 Actuator (control motor)
3 Threaded spindle (actuator output element)
4 Guide sleeve (first clutch component)
4*a* Receiving bore
5 Drive output element (second clutch component)
5*a* Extension piece
5*b* Connection piece
5*c* Bolt bore
5*d* Bore
6 Clutch
7 Locking element
8 Coupling element
9 Traction cable anchor
9*a* Cylindrical section
9*b* Cylindrical section
9*c* Conical section
10 Traction cable
11 Spring
12 Radial bore
13 Groove
14 Through-opening
15 Through-opening
16 Through-opening
17 Through-opening
18 Securing ring
18*a*, *b*, *c* Projections
18*d*, *e* Ends
20 Annular groove
24 Guide sleeve (first clutch component)
25 Drive output element
25*a* Extension piece
29 Traction cable anchor
29*a* Cylindrical section
29*b* Cylindrical section
M Mid-point
a Axial displacement
A End position
B End position
s Displacement path
P Double arrow
E Arrow (release direction)

The invention claimed is:

1. A device (1) for actuating a parking lock comprising an emergency release means, the device (1) for actuating the parking lock comprising:
    an electric actuator (2) with an actuator output element (3), the actuator output element is biased by the electric actuator to move in translation along a movement axis, and
    the actuator output element (3), when moved in translation, actuating the parking lock,
    wherein the actuator output element (3) is connected to the parking lock by a clutch (6), when the clutch is engaged, the actuator output element is movable along the movement axis in opposite directions to engage and disengage the parking lock and the clutch is releasable by the emergency release means such that the parking lock is disengageable while the actuator output element is stationary along the movement axis.

2. The device (1) for actuating the parking lock according to claim 1, wherein the clutch (6) comprises first and second clutch components (4, 5) which can be engaged with one another, and the first clutch component (4) is connected to the actuator output element (3) and the second clutch component (5) to the parking lock.

3. The device (1) for actuating the parking lock according to claim 2, wherein the first and the second clutch components (4, 5) are lockable with one another by at least one locking element (7, 18).

4. The device (1) for actuating the parking lock according to claim 3, wherein, via actuation of the emergency release means, the clutch (6) can be released and the first and the second clutch components (4, 5) can be separated.

5. The device (1) for actuating the parking lock according to claim 3, wherein the at least one locking element is the form of a ball (7).

6. The device (1) for actuating the parking lock according to claim 5, wherein the ball is a ball-drop catch (7, 12, 18).

7. The device (1) for actuating the parking lock according to claim 3, wherein the at least one locking element is in the form of a securing ring (18).

8. The device (1) for actuating the parking lock according to claim 3, wherein the first clutch component is in the form of a guide sleeve (4) which is solidly connected with the actuator output element (3).

9. The device (1) for actuating the parking lock according to claim 3, wherein the second clutch component (5) comprises an extension piece (5a) and the first clutch component (4) comprises a receiving bore (4a), and the extension piece (5a) slides into the receiving bore (4a).

10. The device (1) for actuating the parking lock according to claim 9, wherein the extension piece (5a) can be locked relative to the receiving bore (4a).

11. The device (1) for actuating the parking lock according to claim 3, wherein the second clutch component (5) is articulated to a coupling element (8).

12. A device (1) for actuating a parking lock comprising an emergency release means, the device (1) for actuating the parking lock comprising:
- an electric actuator (2) with an actuator output element (3) being moveable in translation, and
- the actuator output element (3), when moved in translation, actuating the parking lock,
- the actuator output element (3) is connected to the parking lock by a clutch (6), and the clutch is releasable by the emergency release means;
- the clutch (6) comprises first and second clutch components (4, 5) which can be engaged with one another, and the first clutch component (4) is connected to the actuator output element (3) and the second clutch component (5) to the parking lock;
- the first and the second clutch components (4, 5) are lockable with one another by at least one locking element (7, 18);
- via actuation of the emergency release means the clutch 6 can be released and the first and the second clutch components (4, 5) can be separated; and
- the emergency release means comprises a traction cable (10) with a traction cable anchor (9, 29) which is in active connection with the at least one locking element (7, 18) and is supported on the second clutch component (5).

13. The device (1) for actuating the parking lock according to claim 12, wherein the traction cable anchor (9, 29) has a first cylindrical section (9a, 29a), with a larger diameter, and a second cylindrical section (9b, 29b), with a smaller diameter, and the traction cable anchor (9, 29) is located in a bore (5d) of the second clutch component (5).

14. The device (1) for actuating the parking lock according to claim 13, wherein the traction cable anchor (9) is supported, via a spring (11), in a pulling direction, against the second clutch component (5).

15. The device (1) for actuating the parking lock according to claim 14, wherein the traction cable anchor (9) is supported, in a direction opposite to the pulling direction, against the first clutch component (4).

16. A device (1) for actuating a parking lock comprising an emergency release mechanism, the device (1) for actuating the parking lock comprising:
- an electric actuator (2) with an actuator output element (3), the actuator output element is moveable in translation along a movement axis, and
- the actuator output element (3), when moved in a first direction, along the movement axis disengaging the parking lock and when moved in an opposite second direction along the movement axis, engaging the parking lock,
- wherein the actuator output element (3) is connected to the parking lock by a clutch (6), the clutch comprises first and second clutch elements and each of the first and the second clutch elements is movable along the movement axis, and the clutch is disengageable by the emergency release mechanism to permit manual movement of the clutch in the first direction to disengage the parking lock.

17. The device (1) for actuating the parking lock according to claim 16, wherein the first and the second clutch components (4, 5) are lockable with respect to one another by at least one locking element (7, 18) such that when locked the first and the second clutch components are moved together by the actuator output element along the movement axis in the first and the second directions to respectively disengage and engage the parking lock.

* * * * *